Figure 1:
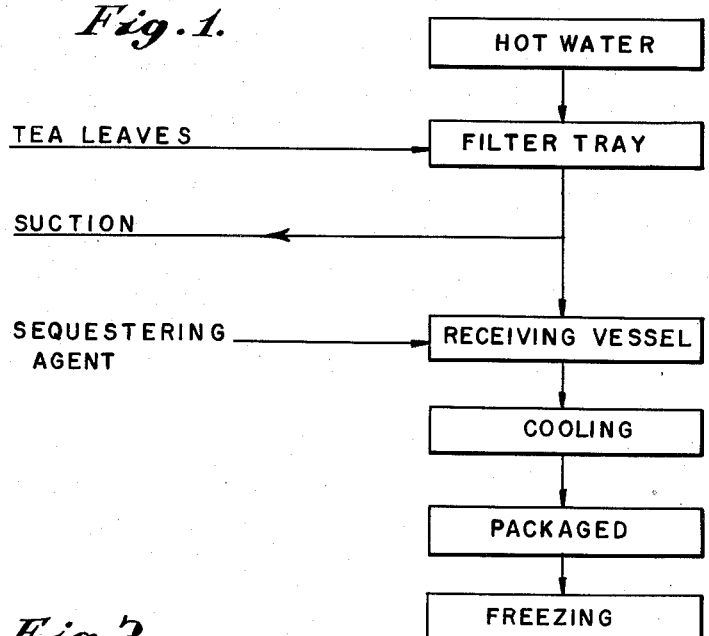

April 4, 1961 D. E. MELZARD ET AL 2,978,328
PROCESS FOR PRODUCING A TEA CONCENTRATE
Filed June 24, 1958

INVENTORS
DOUGLAS E. MELZARD
DAVID A. KENDALL
ALBERT J. KARAS
BY
Cushman, Darby & Cushman
ATTORNEYS United States Patent Office 2,978,328
Patented Apr. 4, 1961

2,978,328
PROCESS FOR PRODUCING A TEA CONCENTRATE

Douglas Ernest Melzard, Swampscott, and David A. Kendall, West Newton, Mass., and Albert J. Karas, Catonsville, Md., assignors, by direct and mesne assignments, to Tea Corporation, Baltimore, Md., a corporation of Maryland Filed June 24, 1958, Ser. No. 744,111

14 Claims. (Cl. 99—77)

The present invention relates to a new method for producing a liquid tea concentrate from tea leaves and to be improved concentrate resulting therefrom. More particularly, the invention relates to an aqueous tea concentrate of high concentration, rapid solubility in cold or hot water, acceptable clarity following reconstitution in water, as well as flavor quality equivalent to tea brewed from tea leaves by conventional methods. It can be appreciated that liquid tea concentrate of this invention constitutes a so-called "instant tea" that, when diluted with cold or hot water, results in a tea beverage.

It should immediately be noted that the invention represents a novel and radical departure from former "instant tea" processes and products in that the final liquid tea concentrate contemplates highly concentrated extract that is made without the removal of water, hence without loss of flavor; that can be readily reconstituted with cold water; and that will yield a tea beverage of acceptable clarity upon reconstitution. Thus, as will be fully explained hereinafter, a final tea concentrate is obtained of far better flavor, aroma, and appearance characteristics than realized by prior processes.

Various methods have been utilized in the past for the preparation of a liquid or powdered tea concentrate. Mowever, none of these methods or products derived therefrom has met with significant commercial success. The liquid concentrates have been commercially unsuccessful since they are too dilute and due to the unstable flavor characteristics and deterioration thereof on standing. More concentrated preparations and the powdered concentrates both usually prepared by the removal of water suffer from the loss of volatile flavor and the introduction of undesirable off-notes.

Furthermore, presently known concentrates have to be reconstituted with hot water for satisfactory solubility and clarity. The disadvantages of this feature, particularly with regard to the preparation of institutional iced tea are quite evident.

Present day tea concentrates tend to cloud up at temperatures of 35° F to 120° F. This unappealing effect is particularly evident when such concentrates are reconstituted with other than hot water. Effects to prevent the clouding reaction have heretofore involved adding sugar or other carbohydrate or filtering to remove the cloud, or both. The addition of sugar is obviously undesirable for those who prefer unsweetened tea. The final filtration is disadvantageous since in removing the cloud important flavor constituents are removed.

With the above in mind, the primary object of this invention is to produce a highly concentrated, fully flavored, tea concentrate from tea leaves by a process which results in retention of tea flavor and aroma as well as the ability to be more acceptably reconstituted in the final beverage product, than was achieved by processes heretofore employed.

Another object of this invention is to provide a process for producing a highly concentrated, fully flavored tea concentrate from tea leaves whereby substantially all of the characteristics achieved by conventional brewing of tea, are present in the final product when reconstituted with water.

A further object of this invention is to provide a process for producing a tea concentrate capable of being reconstituted with water to form a tea drink, comprising providing a quantity of tea leaves, treating said tea leaves with boiling water to extract a tea concentrate therefrom, combining said tea concentrate with a calcium sequestering agent, and then cooling and freezing said concentrate.

An additional object of this invention is to provide a process as noted heretofore wherein the tea leaves utilized are formed into a bed and hot water is filtered therethrough for the purpose of forming the final concentrate.

Still another object of the invention is to provide a process for producing a tea concentrate capable of being reconstituted with water to form a tea drink, comprising providing a quantity of ground tea leaves, placing said tea leaves in a filter bed to a depth of not less than about 1¼ inches, pouring two successive volumes of hot water over said bed of tea leaves to extract a tea concentrate therefrom, combining said tea concentrate with a polyphosphate sequestering agent, and then cooling and freezing said concentrate.

Still another object of this invention is to produce a highly concentrated and fully flavored liquid tea extract composed of tea solids extracted from tea leaves, water, and a calcium sequestering agent, whereby reconstitution of said concentrate yields a tea drink of high concentration, acceptable clarity and good flavor quality.

Other and further objects of the invention will be in part apparent and in part set out in the detailed description of the several steps in the process which follows.

The three methods by which a tea beverage is presently prepared include (a) steeping tea leaves in hot water; (b) adding hot or cold water to a liquid concentrate of tea; and (c) adding hot or cold water to a powdered concentrate of tea. At present, practically all tea drinks are made by steeping tea leaves in hot water because the tea concentrates now on the market lack one or more of these features such as rapid solubility with hot or cold water, acceptable clarity following reconstitution with water, high concentration, and good flavor quality.

Our process contemplates a method whereby ground or chopped unground tea leaves are placed in filtering apparatus. A quantity of fresh boiling water is then poured over the tea leaves, preferably in successive portions. Suction draws the water through the leaves into a receiver vessel containing a solution of a calcium sequestering agent. After mixing, the concentrate is cooled, poured into a marketable container, and then frozen. When it is desired to use the concentrate, it is merely reconstituted by the addition of hot or cold water, depending upon, of course, whether hot or cold tea is desired.

Figure 2:
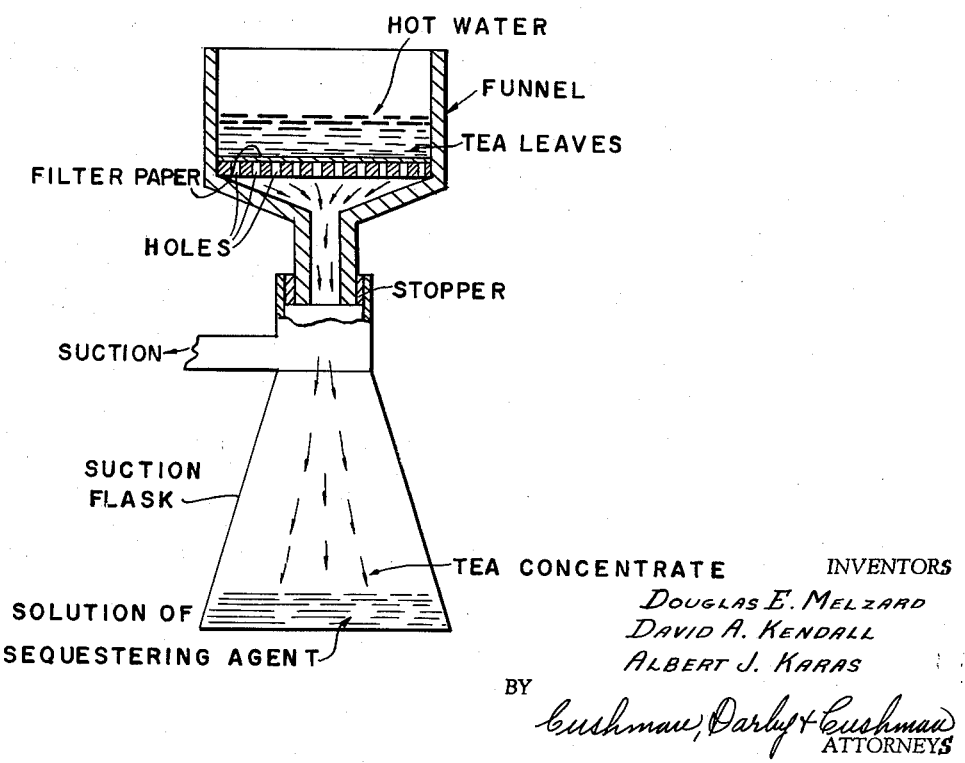

Referring to the accompanying drawnig:

Figure 1 illustrates a flow diagram of the preferred sequence of steps comprising the process; and Figure 2 illustrates one form of apparatus for application of our invention.

In the flow sheet of Figure 1, a given weight of tea leaves are placed in a filter tray and hot water is poured thereover. The hot tea extract is thereby drawn through the filter into the receiving vessel under suction, a sequestering agent solution having been added to the receiving vessel prior thereto. Preferably, the hot water is added in two equal portions. When all of the water has been substantially drawn through the tea leaves, the aqueous concentrate is then rapidly cooled, packaged, and frozen, producing a frozen tea concentrate which may be marketed in that form. On reconstitution by the addition of either hot or cold water, a tea drink is obtained which is substantially equivalent in flavor and other properties to a tea beverage prepared by the normal steeping technique.

Referring now to Figure 2, this drawing illustrates one type of apparatus which may be used to practice the above process. As illustrated, a filter paper is placed over the perforated bottom of a Büchner funnel and a bed of tea leaves or ground tea is placed thereon. The funnel is inserted in the mouth of a suction flask by means of a rubber stopper or cork, as shown, and the flask is in turn connected to suction means such as a water aspirator (not shown). Hot water having a temperature from about 180° F. to about 220° F., is poured onto the bed of tea leaves and then drawn through the filter paper and perforated bottom of the funnel into the suction glass. As indicated, an appropriate solution of a polyphosphate or other sequestering agent is placed in the bottom of the suction glass.

It will be understood that Figure 2 is intended to illustrate only one form of apparatus which might be used and suitable variations thereof will be apparent to those skilled in the art. Obviously, it is the functional arrangement of a filtering device, means such as filter paper to retain the extracted tea leaves therein, and a vessel with means for applying suction thereto which are the important features.

In some cases, it will be found desirable to place a second layer of filter paper on top of the tea leaves to hold them in position in the bed, to aid in the uniform distribution of the boiling water throughout the bed, and to aid in preventing channeling through the bed so that a thorough extraction will be achieved.

In this connection, it has been observed that a number of methods might be used for preparing a tea concentrate, i.e., pot steeping, modified Chemex, Büchner funnel method, percolation, high pressure extraction, and centrifugation. By all of these methods, a 5% solids brew can be obtained, but only the modified Chemex or Büchner funnel method results in a good flavorful product.

Similarly the use of whole tea is a conceivable possibility, but is inoperative as a practical matter in the present invention. Thus, while a tea concentrate having a 5% solids content can be prepared with essentially the same flavor characteristics as a 7% solids brew prepared from ground tea, it has less body of flavor and less bloom. More important, however, is the fact that for some reason the stability of the liquid concentrate is poor. After storage at 38° F., for two weeks, the flavor begins to change unfavorably.

As indicated heretofore, an important feature in practicing the present process is to prepar a bed of tea leaves, or ground tea, of suitable depth. While a tea concentrate can be prepared using beds of varying depths, it has been found that the best results are obtained when this depth is between ⅞ inch and 2¾ inches. Preferably, when ground tea is used, the bed depth is between ⅞ and 1¼ inches. On the other hand, when tea leaves are used, the bed depth is preferably 1½ and 2½ inches. It will be understood that, in this specification, "particulated tea leaves" is meant to include leave which have been chopped but still retain their fibrous particulae character, and such as are used in presently used tea bags and ground tea of a size such that about 80% will pass through a #20 to #80 standard mesh screen. Ground tea is preferred.

The ratio of the amount of water used to the amount of tea in the filtering unit may again be varied between wide limits, but it has been found that certain ratios give the best results with respect to the flavor exhibited by the reconstituted tea beverages. This ratio may be between 60 and 240 grams of tea/liter of water, a ratio of 180 g./l. being preferred. When such a ratio is used, the percentage of solids in th brew is within the desired limits and undesirable properties in the reconstituted beverage such as bitter, woody, or astringent after-tastes are maintained at levels comparable to the properties of a normally prepared tea beverage.

With respect to the sequestering agent, extensive studies have shown that the hitherto observed and undesirable cloudiness in the liquid obtained after reconstitution is largely due to the presence of calcium ion in the water. In the present invention, this effect is avoided by the use of a sequestering agent which will "tie up" this mineral impurity, characteristically found in water supplies. Very suitable agents for this purpose are polyphosphates, and these include sodium metaphosphate, sodium pyrophosphate, tetrasodium pyrophosphate, sodium tripolyphosphate, potassium tripolyphosphate, tertapotassium polyphosphate, tetrasodium monopotassium tripolyphosphate, and Hexaphos (sodium hexametaphosphate). The amount of phosphate used ranged from 5.0 to 20 grams/liter of tea concentrate. Based on clarity, sodium metaphosphate and Hexaphos were the best agents, with Hexaphos being preferred of these two. Sodium tripolyphosphate, tetrasodium monopotassium tripolyphosphate and potassium tripolyphosphate were the next preferred in that order. The sequestering agent is preferably added to the tea extract as described hereinabove, but obviously may be added at other stages. Thus, it can be added to the water prior to extraction or alternatively to the extract after all the water has been drawn through the leaves. If the agent is added first to the water we have found that, surprisingly, the water does not wet the leaves as thoroughly or as quickly and the extraction is less efficient.

The whole process must be rapid in order to obtain the best results. Preferably, the contact of the tea with hot water is under five minutes. The time from extraction to cooling to 100° F. should be between about three to about five minutes and the time for filling and sealing the containers about five minutes. This whole process should be carried out in less than about thirty minutes, a time of less than twenty minutes being generally sufficient and preferred. A convenient technique for keeping this time at a minimum is to provide a cooling bath around the receiving flask.

It is believed that the invention may be clearly understood in the light of the following examples, but it is clearly not limited to the specific processes illustrated therein.

EXAMPLE I

Ground tea (360 g.) was placed on a filter paper in a Büchner funnel (12″) at a bed depth of 1⅝″. The funnel was mounted on a suction flask of suitable capacity in which had been placed sodium hexametaphosphate (1.0 g., dissolved in 75 cc. water). Hot water (200° F., 2 liters) was poured over the tea in two separate portions (1 liter each) while a vacuum, generated by a water aspirator, was applied to the suction flask. The hot concentrate was thereby drawn into the flask and the contents thoroughly mixed. This concentrate was then cooled immediately to 100° F. The time from extraction to cooling was about five minutes. The mixed concentrate was then placed in polyethylene bags which were promptly sealed. This operation consumed about five minutes. The packages were then frozen at Dry Ice temperature and stored at a temperature of 0° F. to 5° F.

The following table summarizes additional conditions which may be employed, the manipulative technique being the same as in Example I.

It should be noted that while the examples below employ two liters of water, this being a convenient amount and yielding in some respects generally the best results, other absolute amounts can be employed so long as the weight-volume ratio of tea to water is within the prescribed limits.

Table 1

| Ex. | Tea Type[1] | Wt. (g.) | Bed Depth (in.) | Water Am't (l.) | Water Temp. (° F.) | Portions | Seq. Agent Type[2] | Seq. Agent Am't[4] | Cooled Temp. (° F.) | Time Extraction to Cooling (min.) | Package Type[3] | Freezing Time (min.) | Freezing Temp. (° F.) | Freezing Time (min.) | Storage Temp. (° F.) |
|---|---|---|---|---|---|---|---|---|---|---|---|---|---|---|---|
| II | A | 300 | 7/8 | 2 | 200 | 2 | a | 1/50 | 100 | 4 | can | 3 | −120 | 5 | −120 |
| III | A | 380 | 2 | 2 | 200 | 2 | b | 1.5/90 | 40 | 5 | bag | 4½ | −120 | 6 | −120 |
| IV | B | 480 | 2¾ | 2 | 190 | 2 | b | 2.5/100 | 80 | 4 | can | 5 | −40 | 5 | −120 |
| V | A | 360 | 1¾ | 2 | 180 | 1 | a | 2/100 | 40 | 4½ | can | 4 | −40 | 4 | −40 |
| VI | B | 350 | 1⅞ | 2 | 210 | 2 | c | 1.8/75 | 40 | 5 | bag | 5 | −80 | 5 | −40 |
| VII | B | 140 | 1⅛ | 2 | 200 | 2 | d | 2/50 | 100 | 4 | bag | 5 | −20 | 6 | 0 |
| VIII | B | 400 | 2¼ | 2 | 190 | 1 | a | 3/100 | 60 | 4½ | bag | 4½ | 0 | 6 | −40 |
| IX | A | 330 | 1½ | 2 | 190 | 2 | e | 1.3/50 | 40 | 4½ | bag | 4½ | −40 | 5 | 0 |
| X | A | 390 | 1¾ | 2 | 200 | 1 | b | 2.7/90 | 40 | 5 | can | 3½ | −40 | 5 | 40 |

Notes to table:
[1] "A" indicates ground tea, passing through a screen of #20 to #80 mesh; "B" indicates tea-bag grade chopped tea leaves.
[2] The following sequestering agents are indicated by the symbols: a, sodium hexametaphosphate; b, sodium metaphosphate; c, tetrasodium pyrophosphate; d, potassium tripolyphosphate; e, tetrasodium monopotassium tripolyphosphate.
[3] "Can" signifies an enamel-lined can; "bag" signifies a polyethylene bag.
[4] Expressed in no. of gms. in/no. of cc. of aqueous solution.

In the practice of this invention in accordance with the above examples, pressure may also be applied to the extracted bed of tea leaves to force out the full quantity of tea concentrate. This may be done by applying a pressure of, for instance, 15 lbs. per square inch, or more, to a ceramic or metal plate placed on top of the bed.

The reconstituted tea beverage may be prepared by adding a suitable quantity of water, about 10 to 25 parts, to 1 part of concentrate depending on the strength desired. Whether the final beverage is prepared by reconstitution with hot or cold water, from a temperature of 35° F. to 120° F. no "clouding" was observed with the concentrates prepared according to the above examples.

By using the above-described technique and conditions concentrates containing from about 5% to about 7% or more, for instance up to 10%, solids have been obtained with an extraction of about 20% to about 22% of the solids from the tea. It will be appreciated that the economics of tea brewing depends upon the degree of extraction. By way of comparison, the standard pot-brewing technique extracts 26% solids from the tea into a brew containing only 0.3% solids.

The following table compares the flavor characteristics of tea beverage prepared by the standard pot-brewing technique and the reconstituted tea prepared from a concentrate obtained from ground tea (using 360 g. tea per 2 liters water). The descriptive analysis of the flavor of the tea represented in the table was prepared according to the ADL Favor Profile procedure described in Food Technology, vol. IV, No. 8, pp. 308–311, 1950. This description includes the aromatic and flavor notes, order of appearance and intensities, and amplitude (total sensory impression for aroma and flavor).

Table 2
FLAVOR DIFFERENCES BETWEEN STANDARD BREW AND RECONSTITUTED BREWS

|  | Standard Brew | Reconstituted Brews |
|---|---|---|
| Aroma: | | |
| Amplitude | 2 | 1½ |
| Sweet Fragrance | 2 | 1½ |
| Sour | 1 | 1 |
| Dried green vegetation | 1½ | 1–1½ |
| Bloom | 1 | ½–1 |
| Flavor-by-Mouth: | | |
| Amplitude | 1½–2 | 1 |
| Sweet | 1 | ½–1 |
| Sweet fragrance | 2 | 1½ |
| Sour | 1 | 1 |
| Woody | 1½ | 1½ |
| Bitter | ½ | 1 |
| Astringent | ½ | 1 |
| Aftertaste | Sour, Woody, Drying | Sour, Woody, Drying |

It will be understood that the novel principles of this invention are broader than the specific embodiments recited above, and rather than unduly extend this disclosure by attempting to list all the numerous modifications which have been conceived and reduced to practice during the course of this development, these novel features are limited only by and substantially defined in the following claims.

We claim:

1. A process for producing a tea concentrate capable of being reconstituted with water to form a tea beverage comprising treating a quantity of particulated tea leaves with hot water to extract a tea concentrate therefrom, combining said tea concentrate with a non-toxic calcium sequestering agent which is in amount sufficient to combine with substantially all of the calcium ions present in the final tea beverage but insufficient to affect adversely the delicate flavor and aroma constituents of the tea, cooling and freezing said concentrate.

2. A porcess as claimed in claim 1 wherein said tea leaves are formed into a bed and said hot water is filtered therethrough.

3. A process as claimed in claim 2 wherein said bed of tea leaves has a depth not less than ⅞ inch.

4. A process as claimed in claim 1 wherein the ratio of the amount of said tea leaves by weight to the amount of said water by volume is from about 60 grams per liter to about 240 grams per liter.

5. A process as claimed in claim 1 wherein the temperature of said water is from about 180° F. to about 220° F.

6. A process as claimed in claim 1 wherein the total time from said treating to said freezing is less than thirty minutes.

7. A process as claimed in claim 1 wherein pressure is applied to said tea leaves, after said treatment with hot water, to remove said tea concentrate therefrom.

8. A process as claimed in claim 1 wherein said calcium sequestering agent is an inorganic polyphosphate compound.

9. A process as claimed in claim 8 wherein said polyphosphate compound is sodium hexametaphosphate.

10. A process as claimed in claim 8 wherein said polyphosphate compound is sodium metaphosphate.

11. A process as claimed in claim 8 wherein said polyphosphate compound is sodium tripolyphosphate.

12. A process as claimed in claim 8 wherein said polyphosphate is tetrasodium monopotassium tripolyphosphate.

13. A process as claimed in claim 8 wherein said polyphosphate is potassium tripolyphosphate.

14. A process as claimed in claim 8 wherein said polyphosphate is present in an amount from 5.0 to 20 grams per liter of tea concentrate.

References Cited in the file of this patent

UNITED STATES PATENTS

| 2,668,771 | Hall | Feb. 9, 1954 |
| 2,852,388 | Cortez | Sept. 16, 1958 |
| 2,891,866 | Schroeder | June 23, 1959 |